(12) United States Patent
Nishio et al.

(10) Patent No.: US 11,527,744 B2
(45) Date of Patent: *Dec. 13, 2022

(54) SECONDARY-BATTERY ELECTRODE AND SECONDARY-BATTERY ELECTRODE MANUFACTURING METHOD, AND SECONDARY BATTERY AND METHOD OF MANUFACTURING SECONDARY BATTERY

(71) Applicant: SANYO Electric Co., Ltd., Daito (JP)

(72) Inventors: Kazuya Nishio, Hyogo (JP); Tetsuya Sato, Hyogo (JP); Mituhiro Yosinaga, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 187 days.

This patent is subject to a terminal disclaimer.

(21) Appl. No.: 16/327,997

(22) PCT Filed: Aug. 29, 2017

(86) PCT No.: PCT/JP2017/030827
§ 371 (c)(1),
(2) Date: Feb. 25, 2019

(87) PCT Pub. No.: WO2018/043443
PCT Pub. Date: Mar. 8, 2018

(65) Prior Publication Data
US 2019/0198853 A1    Jun. 27, 2019

(30) Foreign Application Priority Data

Aug. 31, 2016  (JP) .............................. JP2016-170071

(51) Int. Cl.
*H01M 4/04*    (2006.01)
*B23K 26/38*   (2014.01)
(Continued)

(52) U.S. Cl.
CPC ........... *H01M 4/043* (2013.01); *B23K 26/082* (2015.10); *B23K 26/0846* (2013.01);
(Continued)

(58) Field of Classification Search
CPC ................... H01M 4/043; H01M 4/04; H01M 4/139–1399; B23K 26/38; B23K 26/402;
(Continued)

(56) References Cited

U.S. PATENT DOCUMENTS

2006/0016308 A1* 1/2006 Katai ................... B26D 1/0006
83/318
2010/0024203 A1* 2/2010 Kim ..................... H01M 4/1391
29/623.1
(Continued)

FOREIGN PATENT DOCUMENTS

CN      104051705 A      9/2014
CN      105322213 A      2/2016
(Continued)

OTHER PUBLICATIONS

International Search Report dated Nov. 7, 2017, issued in counterpart International Application No. PCT/JP2017/030827 (2 pages).
(Continued)

*Primary Examiner* — Eugenia Wang
(74) *Attorney, Agent, or Firm* — WHDA, LLP

(57) ABSTRACT

A secondary-battery electrode manufacturing method that allows a secondary-battery electrode including a neat linear cut portion to be stably manufactured at a high speed is provided. A method of manufacturing a secondary-battery electrode (10), which is an example of an embodiment, comprises a first step of forming an active material layer (22) on at least one surface of a long core body (21). The method of manufacturing the secondary-battery electrode (10), which is an example of the embodiment also comprises a
(Continued)

second step of cutting an electrode precursor (20) into a predetermined shape by using a continuous wave laser, the electrode precursor (20) being the long core body (21) having the active material layer (22) formed thereon.

6 Claims, 6 Drawing Sheets

(51) Int. Cl.
| | |
|---|---|
| *H01M 4/139* | (2010.01) |
| *H01M 4/13* | (2010.01) |
| *B23K 26/402* | (2014.01) |
| *B23K 26/08* | (2014.01) |
| *B23K 26/082* | (2014.01) |
| *H01M 50/531* | (2021.01) |
| *H01M 10/0525* | (2010.01) |
| *B23K 103/16* | (2006.01) |
| *B23K 103/12* | (2006.01) |
| *B23K 103/10* | (2006.01) |
| *B23K 101/38* | (2006.01) |

(52) U.S. Cl.
CPC ............ *B23K 26/38* (2013.01); *B23K 26/402* (2013.01); *H01M 4/04* (2013.01); *H01M 4/13* (2013.01); *H01M 4/139* (2013.01); *H01M 10/0525* (2013.01); *H01M 50/531* (2021.01); *B23K 2101/38* (2018.08); *B23K 2103/10* (2018.08); *B23K 2103/12* (2018.08); *B23K 2103/172* (2018.08)

(58) Field of Classification Search
CPC .............. B23K 26/0846; B23K 26/082; B23K 2103/172; B23K 2103/12; B23K 2103/10
See application file for complete search history.

(56) References Cited

U.S. PATENT DOCUMENTS

| | | | |
|---|---|---|---|
| 2010/0028767 A1 | 2/2010 | Inose et al. | |
| 2011/0187025 A1* | 8/2011 | Costin, Sr. | ............... B41M 5/24 |
| | | | 264/400 |
| 2016/0036009 A1 | 2/2016 | Cho et al. | |
| 2016/0214205 A1* | 7/2016 | Tsukada | ................. B23K 37/08 |
| 2016/0359189 A1* | 12/2016 | Fukatsu | ................ H01M 4/622 |
| 2020/0276670 A1 | 9/2020 | Watanabe | |

FOREIGN PATENT DOCUMENTS

| | | |
|---|---|---|
| JP | 2-170351 A | 7/1990 |
| JP | 2001-176501 A | 6/2001 |
| JP | 2006-139919 A | 6/2006 |
| JP | 2007-14993 A | 1/2007 |
| JP | 2010-34009 A | 2/2010 |
| JP | 2012-221912 A | 11/2012 |
| JP | 2014-226706 A | 12/2014 |
| JP | 2015-84279 A | 4/2015 |
| JP | 2016-33912 A | 3/2016 |
| JP | 5965094 B1 | 8/2016 |
| WO | WO-2014103561 A1 * | 7/2014 ............ B23K 26/40 |
| WO | WO-2015129320 A1 * | 9/2015 ............ H01M 4/387 |
| WO | 2016/208679 A1 | 12/2016 |
| WO | 2017/110318 A1 | 6/2017 |

OTHER PUBLICATIONS

English Translation of Office Action dated Jun. 29, 2021, issued in counterpart CN Application No. 201780052883.2 (4 pages).

* cited by examiner

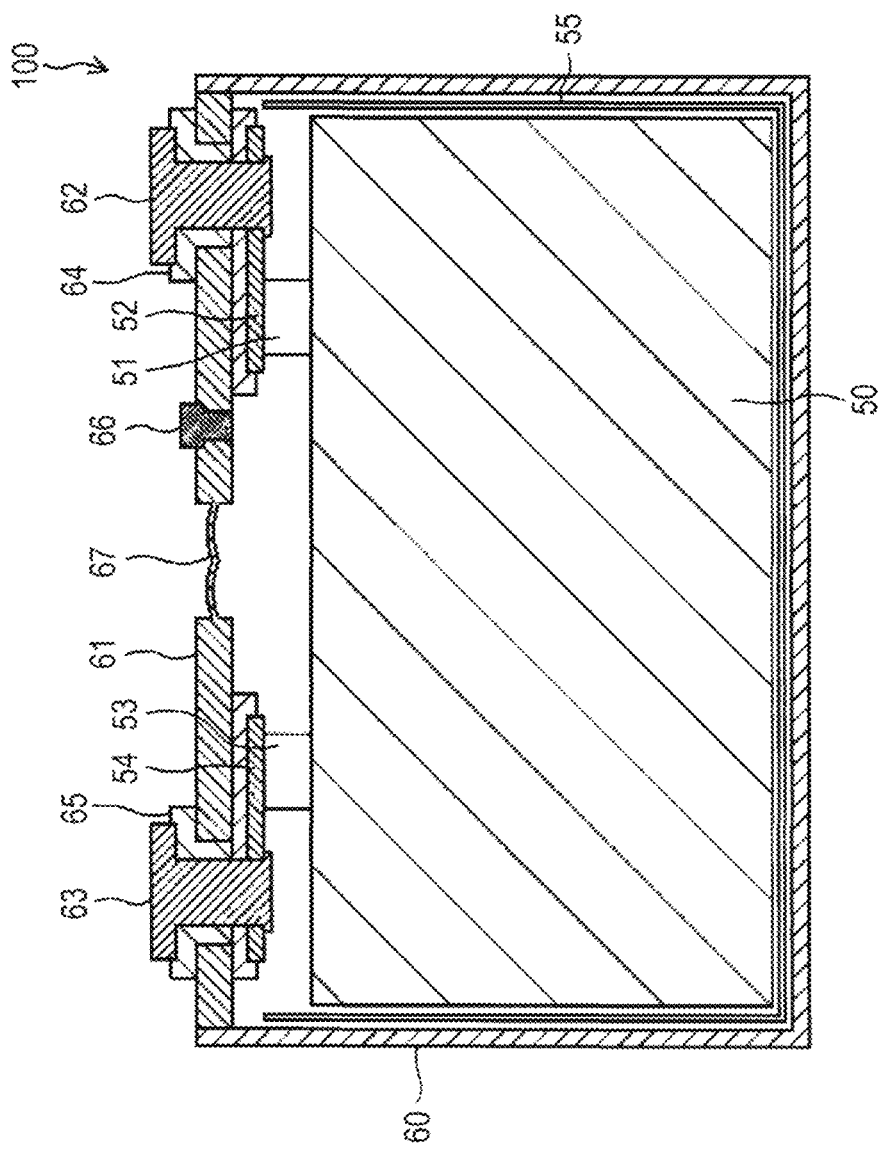

SECONDARY-BATTERY ELECTRODE AND SECONDARY-BATTERY ELECTRODE MANUFACTURING METHOD, AND SECONDARY BATTERY AND METHOD OF MANUFACTURING SECONDARY BATTERY

TECHNICAL FIELD

The present disclosure relates to a secondary-battery electrode and a secondary-battery electrode manufacturing method, and a secondary battery and a method of manufacturing the secondary battery.

BACKGROUND ART

Electrodes used in secondary batteries have been manufactured, for example, by, after forming an active material layer on a long core body, cutting the core body into a predetermined shape and cutting the core body into individual electrode sizes. Patent Document 1 discloses a technology of cutting a long electrode precursor into a predetermined shape by using a laser. In the technology of Patent Document 1, a pulsed-system laser oscillator is used.

CITATION LIST

Patent Document

Patent Document 1: Japanese Published Unexamined Patent Application No. 2007-14993

SUMMARY OF INVENTION

Technical Problem

Neatly cutting the electrode precursor at a high speed and improving the productivity of electrodes is an important issue. In particular, due to an increase in the capacity of secondary batteries, the number of stacks of electrodes of a multilayer-type electrode body has increased or the number of windings of electrodes of a winding-type electrode body has tended to increase. Therefore, a demand for increasing the cutting speed is increasing. However, in existing technologies including the technology of Patent Document 1, it is difficult to neatly cut an electrode precursor at a high speed.

Solution to Problem

A secondary-battery electrode according to the present disclosure comprises a core body and an active material layer formed on at least one surface of the core body, wherein an angle formed by an end surface of the active material layer and a surface of the core body is 55° to 85°, and wherein a protrusion mark exists at the end surface of the active material layer or near the end surface of the active material layer.

A secondary-battery electrode manufacturing method according to the present disclosure comprises a first step of forming an active material layer on at least one surface of a long core body, and a second step of cutting an electrode precursor into a predetermined shape by using a continuous wave laser, the electrode precursor being the long core body having the active material layer formed thereon.

Advantageous Effects of Invention

According to the secondary-battery electrode manufacturing method according to the present disclosure, it is possible to stably manufacture an electrode including a neat linear cut portion at a high speed.

BRIEF DESCRIPTION OF DRAWINGS

FIG. 6 is a sectional view of a secondary battery, which is an example of an embodiment.

DESCRIPTION OF EMBODIMENTS

Figure 1:
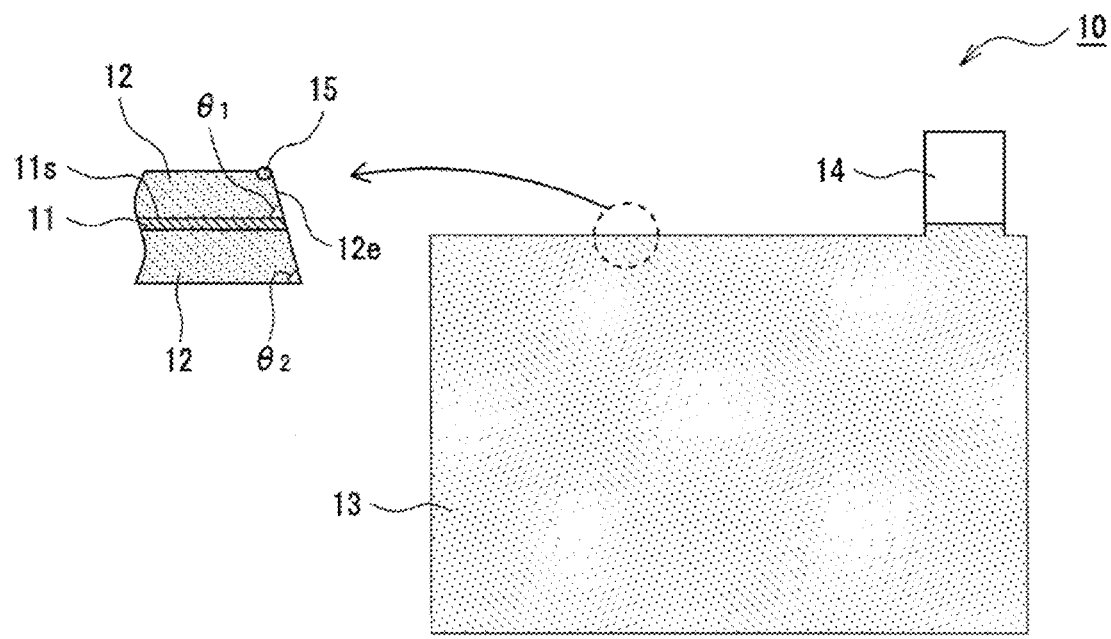
FIG. 1 illustrates a secondary-battery electrode, which is an example of an embodiment.

As described above, due to an increase in the capacity of secondary batteries, neatly cutting an electrode precursor at a high speed and improving the productivity of electrodes is becoming more important. However, it is difficult to cut an electrode precursor at a high speed by performing existing general cutting methods using, for example, a cutter. In cutting methods using a pulse laser such as the cutting method disclosed in the aforementioned Patent Document 1, the shape of a cut portion of the electrode precursor becomes wavy, and, thus, it is difficult to linearly and neatly cut the electrode precursor. Further, when a pulse laser is used, active material layers at a cut portion are removed and, thus, surfaces of core bodies tend to be exposed.

In contrast, according to a secondary-battery electrode manufacturing method according to the present disclosure, by cutting an electrode precursor by using a continuous wave laser (CW laser), it is possible to form a neat linear cut portion at a high speed and to thus considerably increase the productivity of electrodes. When the continuous wave laser is used, although protrusions that may be the cause of a short circuit between positive and negative electrodes tend to be formed on end surfaces of active material layers or near such end surfaces, adjusting laser illumination conditions or performing a step of compressing the active material layers makes it possible to reduce the sizes of the protrusions to sizes that do not influence the removal of the protrusions or battery performance.

An example of an embodiment of a secondary-battery electrode according to the present disclosure and an example of an embodiment of the secondary-battery electrode manufacturing method according to the present disclosure are described in detail below with reference to the drawings. The drawings that are referred to in describing the embodiments are schematic drawings, so that the dimensions etc. of structural elements in the drawings may differ from the dimensions etc. of actual structural elements. Specific dimensions etc. should be determined by taking into consideration the following description. In the present description, when "substantially the same" is taken as an example, the term "substantially . . . " is intended to encompass "can be deemed as being practically the same", not to mention "completely the same".

A secondary-battery electrode 10 applied to a multilayer-type electrode body is taken as an example below. However, the secondary-battery electrode according to the present disclosure may be applied to a winding-type electrode body, and the manufacturing method according to the present disclosure may also be applied to the manufacturing of electrodes for the winding-type electrode body.

FIG. 1 is a front view of the secondary-battery electrode 10, which is an example of the embodiment, with a sectional view of an electrode end portion also being provided. As exemplified in FIG. 1, the secondary-battery electrode 10 includes a core body 11 and active material layers 12 formed on two surfaces of the core body 11. Although an active material layer 12 may be formed on only one of the surfaces of the core body 11, it is desirable that active material layers 12 be formed on two surfaces of the core body 11. The secondary-battery electrode 10 may be either a positive electrode or a negative electrode. However, as described below, the positive electrode and the negative electrode differ in, for example, the material of the core body 11, the active materials etc. contained in the active material layers 12, and electrode size.

The secondary-battery electrode 10 includes a base portion 13 and a lead portion 14 that protrudes from one end of the base portion 13. In the secondary-battery electrode 10, the base portion 13 and the lead portion 14 are integrally molded with each other. The base portion 13 is a portion where the active material layers 12 are formed, and the active material layers 12 are formed on entire regions of the two surfaces of the core body 11. Although the base portion 13 has a rectangular shape that is long in a lateral direction in front view, the shape is not particularly limited. The lead portion 14 protrudes from one end in a long-side direction on one end side of the base portion 13 in a short-side direction, and has a rectangular shape in front view. Although, in general, the active material layers 12 are also formed on a joint of the lead portion 14, the active material layers 12 are not formed on a large portion of the lead portion 14.

The secondary-battery electrode 10 is applied to a multilayer-type electrode body. The multilayer-type electrode body includes a plurality of positive electrodes and a plurality of negative electrodes, the positive electrodes and the negative electrodes being alternately stacked via separators. When the secondary-battery electrode 10 is a positive electrode, lead portions 14 of the plurality of positive electrodes that are stacked upon each other via the separators and the negative electrodes are joined to each other by, for example, welding. In addition, the lead portions 14 are connected to a positive-electrode terminal of the battery either directly or via metallic current-collecting members.

Although the secondary battery to which the secondary-battery electrode 10 is applied is, for example, a non-aqueous electrolyte secondary battery, such as a lithium-ion battery, the secondary battery is not limited thereto. Examples of the secondary battery include a square battery having a square metallic case and a laminated battery including an exterior body formed from a metal-layer laminated film. However, other types of batteries may be used. Hereunder, the secondary-battery electrode 10 is described as being applied to a lithium-ion battery.

When the secondary-battery electrode 10 is a positive electrode, for example, a metallic foil, made of a metal, such as aluminum or an aluminum alloy, that is stable in a positive-electrode electrical potential range, or a film on whose surface layer the metal is disposed may be used in the core body 11 (positive-electrode current-collecting body). The thickness of the positive-electrode current-collecting body is, for example, 5 μm to 30 μm. When each active material layer 12 is a positive-electrode mixed material layer, in general, each active material layer 12 contains a positive electrode active material, such as a lithium transition metal oxide, a conductive material, and a binding material. For example, on one side of the positive-electrode current-collecting body, the thickness of the positive-electrode mixed material layers is desirably 20 μm to 200 μm and is more desirably 50 μm to 150 μm. Although not particularly limited, the conductive material is desirably, for example, a carbon material, and the binding material is desirably, for example, polyvinylidene fluoride.

When the secondary-battery electrode 10 is a negative electrode, for example, a metallic foil, made of a metal, such as copper or a copper alloy, that is stable in a negative-electrode electrical potential range, or a film on whose surface layer the metal is disposed may be used in the core body 11 (negative-electrode current-collecting body). The thickness of the negative-electrode current-collecting body is, for example, 5 μm to 30 μm. When each active material layer 12 is a negative-electrode mixed material layer, in general, each active material layer 12 contains a negative electrode active material, such as a carbon material (for example, natural graphite or artificial graphite), a metal (for example, Si or Sn that forms an alloy with lithium), an alloy, or a composite oxide, and a binding material. For example, on one side of the negative-electrode current-collecting body, the thickness of the negative-electrode mixed material layers is desirably 20 μm to 200 μm and is more desirably 50 μm to 150 μm. Although not particularly limited, the binding material is desirably, for example, a rubber-based binding material, such as styrene-butadiene rubber.

The secondary-battery electrode 10 includes a neat linear cut portion. In the secondary-battery electrode 10, it is desirable that, for example, an angle $\theta 1$ formed by an end surface 12$e$ of the active material layer 12 on one side and a core-body surface 11$s$ be 55° to 85°. The angle $\theta 1$ is, for example, substantially equal to an angle $\theta 2$ formed by the surface of the active material layer 22 on the opposite side and an end surface 22$e$. A protrusion mark 15 sometimes exists at the end surface 12$e$ or near the end surface 12$e$. The protrusion mark 15 is a mark of a protrusion 25, described below, and is observed as a lump-like portion (particle-like portion) having a contrast differing from other portions by a scanning electron microscope (SEM). Although the protrusion mark 15 is embedded in the active material layer 12, the protrusion mark 15 may protrude above the active material layer 12 at a height that does not influence battery performance. In a cross section perpendicular to a laser scanning direction, for example, in a cross section shown in FIG. 1, the size of the protrusion mark 15 is desirably 30 μm to 300 μm and is more desirably 30 μm to 150 μm. The protrusion mark 15 is formed by, for example, compressing the protrusion 25 in the step of compressing the active material layers, the step being described below.

Figure 2:
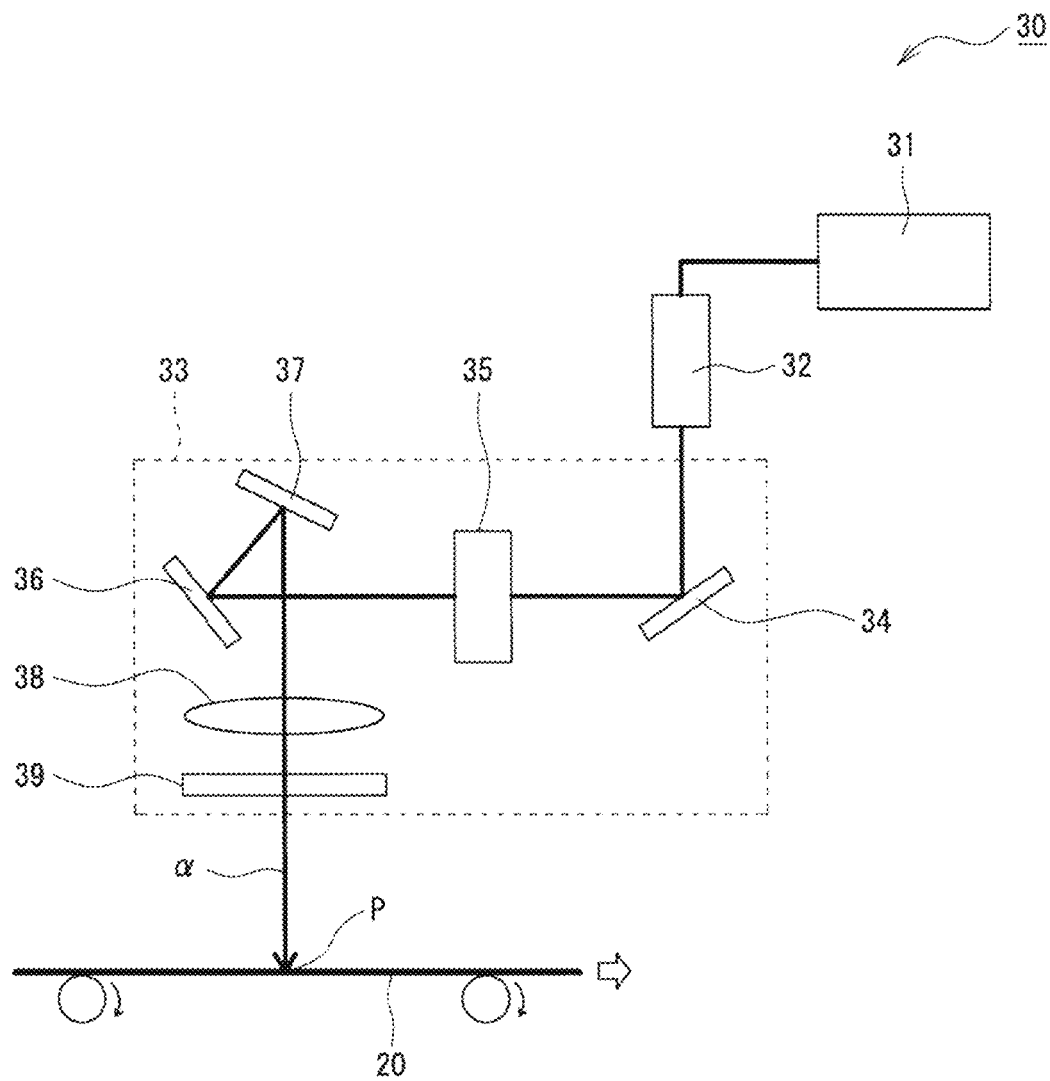
FIG. 2 is an illustration for describing a secondary-battery electrode manufacturing method, which is an example of an embodiment.
Figure 3:
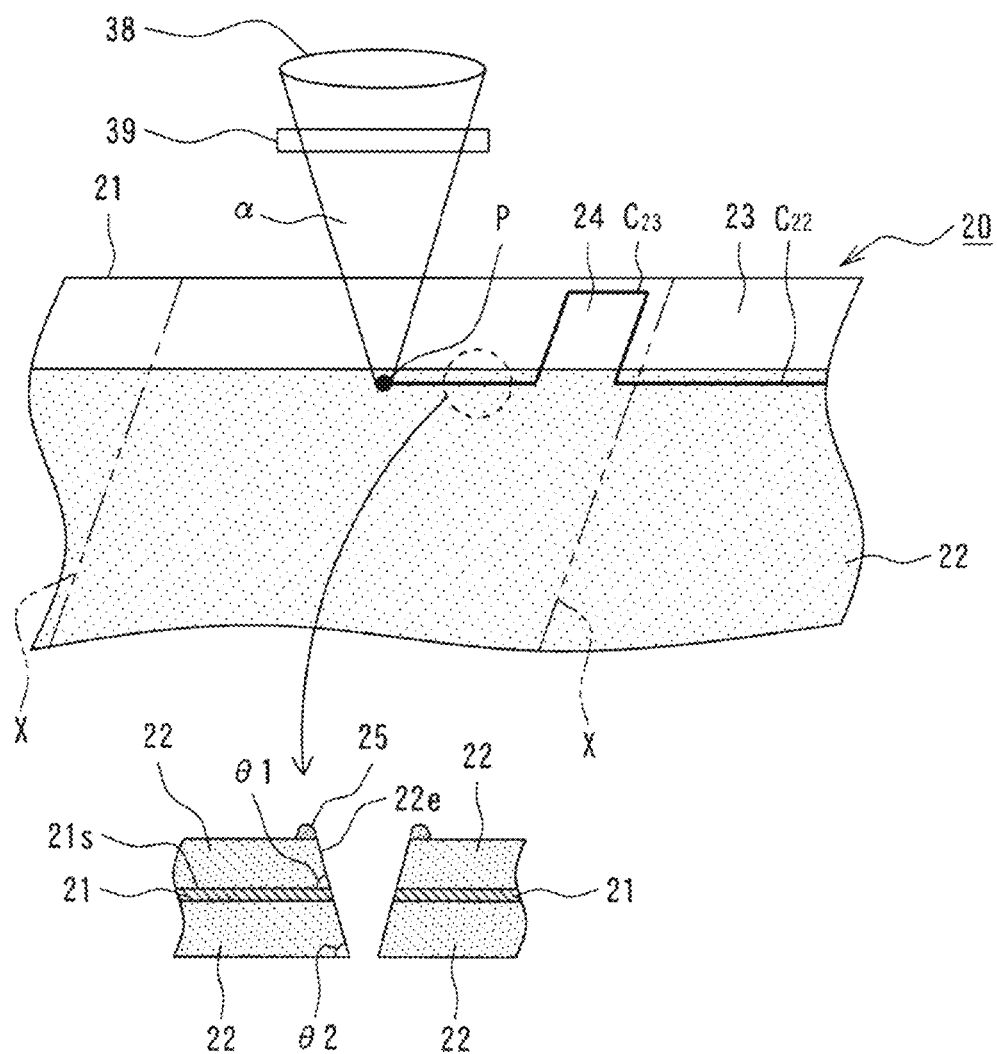
FIG. 3 is an illustration for describing the secondary-battery electrode manufacturing method, which is an example of the embodiment.

With reference to FIGS. 2 to 5, an example of a method of manufacturing the secondary-battery electrode 10 is described below in detail. FIG. 2 shows an overall structure of a laser system 30. FIGS. 2 and 3 each show a state in which an electrode precursor 20 is cut by a laser beam α output from the laser system 30. Here, a member that becomes the core body 11 of the secondary-battery electrode 10 by cutting the electrode precursor 20 is defined as a long core body 21 and layers that become the active material layers 12 are defined as active material layers 22.

As exemplified in FIGS. 2 and 3, the secondary-battery electrode 10 is manufactured by cutting the long electrode precursor 20 into a predetermined shape, the long electrode precursor 20 having the active material layers 22 formed on two surfaces of the long core body 21. A manufacturing process of the secondary-battery electrode 10 includes a first step of forming an active material layer 22 on at least one of the surfaces of the long core body 21 and a second step of cutting the electrode precursor 20 by using the continuous wave laser (CW laser). In the present embodiment, in the first step, the active material layers 22 are formed on the two surfaces of the long core body 21. In the first step, a mixture slurry containing constituent materials of the active material layers 22 is prepared, the slurry is applied to the two surfaces of the long core body 21, and the applied films are dried to form the active material layers 22.

In the first step, an exposed portion 23, where a core-body surface 21s is exposed, is formed in a longitudinal direction of the electrode precursor 20. It is desirable that the exposed portion 23 be formed with a substantially constant width from one end of the long core body 21 in a width direction. The width of the exposed portion 23 is, for example, less than or equal to ⅕ of the width of the long core body 21. Although the exposed portion 23 may be formed by, after forming the active material layers 22 on entire regions of the two respective surfaces of the long core body 21, peeling off and removing a part of each active material layer 22, it is desirable that the exposed portion 23 be formed without applying a mixture slurry to a part of the long core body 21. The long core body 21 has, for example, a width that allows two secondary-battery electrodes 10 to be formed in the width direction. In this case, exposed portions 23 are formed on two end portions of the electrode precursor 20 in the width direction.

In the second step, the laser beam α output from the laser system 30 illuminates the electrode precursor 20 and cuts the electrode precursor 20 into a predetermined shape. In the second step, while changing the position of the electrode precursor 20 and the position of a processing head of the laser system 30 relative to each other, the laser beam α illuminates the electrode precursor 20. Although the laser beam α is capable of scanning the electrode precursor 20 while the electrode precursor 20 is fixed, when the long electrode precursor 20 is to be processed, it is desirable to perform the cutting operation while transporting the electrode precursor 20. The laser beam α may scan the electrode precursor 20 while the electrode precursor 20 is transported.

As exemplified in FIG. 2, the laser system 30 includes a laser oscillator 31 and the processing head that has a galvanometer scanner 33 built therein. By using the galvanometer scanner 33, the laser α is capable of scanning the electrode precursor 20 while the processing head itself is fixed. The laser oscillator 31 is an oscillator capable of continuous oscillation. Examples of the laser oscillator 31 include a YAG laser, a $CO_2$ laser, an Ar laser, and a fiber laser, which are capable of outputting the laser beam α in a continuous oscillation mode. A desirable example is the fiber laser. An example of a desired range of oscillation wavelength is 900 nm to 1200 nm. In the laser system 30, a collimator 32 that forms the laser beam α output from the laser oscillator 31 into a parallel beam is provided between the laser oscillator 31 and the galvanometer scanner 33.

The galvanometer scanner 33 includes a reflecting mirror 34, an optical element 35, an X-axis mirror 36, a Y-axis mirror 37, and an Fθ lens 38 in that order from the side of the laser oscillator 31. For example, a diffraction grating or the like is used for the optical element 35. The laser beam α, which is a continuous wave, that has passed through the collimator 32 is bent towards the side of the optical element 35 by the reflecting mirror 34, passes through the optical element 35, and is guided to the X-axis mirror 36 and the Y-axis mirror 37. By moving the X-axis mirror 36 and the Y-axis mirror 37, the laser beam α performs a scanning operation to allow the position of an illumination spot P to change in a two-dimensional plane. The laser beam α reflected by the X-axis mirror 36 and the Y-axis mirror 37 passes through the Fθ lens 38 and a protective glass 39, and illuminates the electrode precursor 20.

As exemplified in FIG. 3, in the second step, by using the continuous wave laser, a portion of the electrode precursor 20 where the active material layers 22 are provided is cut along the exposed portion 23 and a cutting direction is changed at a substantially constant period to cut the exposed portion 23, so that a protruding portion 24, which becomes the lead portion 14, is formed. Although the laser beam α is capable of illuminating a boundary position between the portion where the active material layers 22 are provided and the exposed portion 23, in this case, a slight displacement of the illumination spot P causes an exposed portion of the core-body surface 11s to be formed on a portion other than the lead portion 14. Since the exposed portion that is formed on a portion other than the lead portion 14 may cause a low-resistance short circuit to occur between the positive and negative electrodes, it is desirable that the electrode precursor 20 be cut so as not to form the exposed portion at, in particular, each positive electrode. Therefore, it is desirable that the electrode precursor 20 be cut by applying the laser beam α to a portion near the exposed portion 23 in the portion where the active material layers 22 are provided.

The laser beam α scans a portion along the exposed portion 23 (in the longitudinal direction of the electrode precursor 20), and scans the side of the exposed portion 23 at a portion corresponding to the protruding portion 24 (in the width direction of the electrode precursor 20). Since the laser beam α continuously illuminates even the boundary position between the portion where the active material layers 22 are provided and the exposed portion 23, a cut portion $C_{22}$ of the portion where the active material layers 22 are provided and a cut portion $C_{23}$ of the exposed portion 23 are formed in one continuous line. By changing the cutting direction at a substantially constant period and cutting the exposed portion 23, a plurality of protruding portions 24 that are disposed side by side at substantially equal intervals in the longitudinal direction of the electrode precursor 20 are formed. Then, the secondary-battery electrode 10 including the base portion 13 on whose entirety the active material layers 12 are formed and the lead portion 14 on whose joint the active material layers 12 are formed is acquired.

In the second step, the electrode precursor 20 may be cut into electrode sizes by using the continuous wave laser. As described above, when the long core body 21 has a width that allows two secondary-battery electrodes 10 to be formed in the width direction, after the cutting step of forming the protruding portions 24, the electrode precursor 20 is cut in the longitudinal direction at the center of the electrode precursor 20 in the width direction. When the electrode precursor 20 is cut at the center in the width direction, each electrode precursor 20 cut to a width corresponding to the width of one secondary-battery electrode 10 is acquired. In the cutting step, it is desirable to use the continuous wave laser. Though described in detail below, each electrode precursor 20 whose size has been adjusted to a width corresponding to one secondary-battery electrode 10 may be supplied to the step of compressing the active material layers 22.

After the electrode precursor 20 has been cut along scheduled cutting portions X and into individual electrode sizes, the active material layers may be compressed. The step of cutting the electrode precursor 20 at the scheduled cutting portions X may be performed by using the continuous wave laser or by an existing general cutting method using a cutter or the like.

Figure 4:
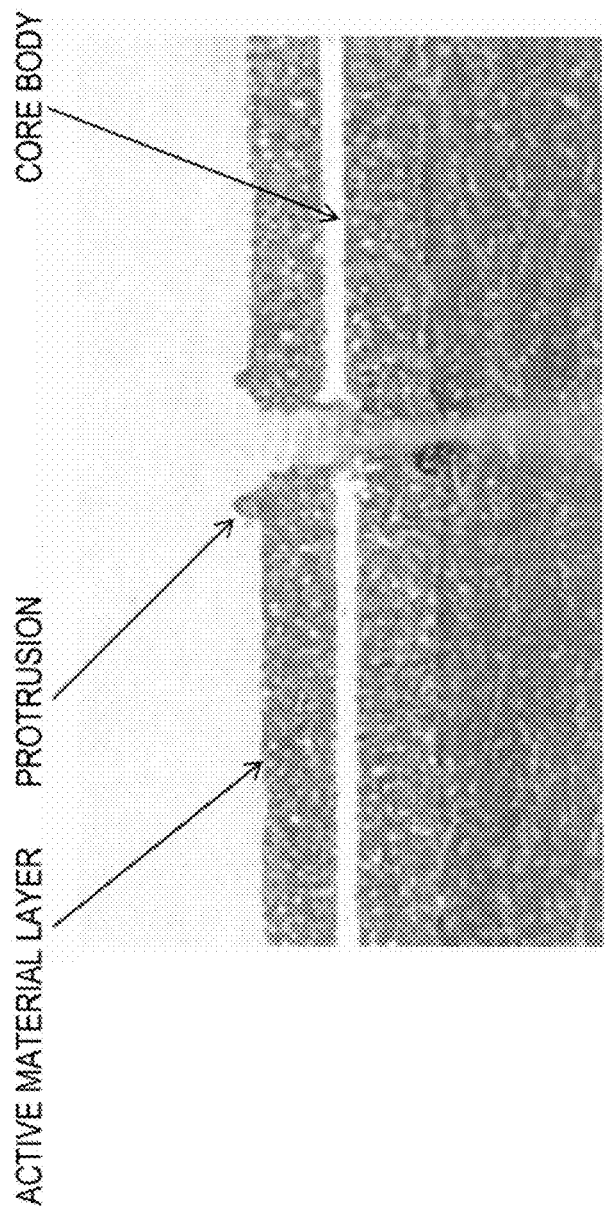
FIG. 4 is a photograph of a cut portion of an electrode precursor, which is an example of an embodiment, taken by an electron microscope.

FIG. 4 is a photograph of a cross section of the cut portion $C_{22}$ of the electrode precursor 20 and the vicinity thereof taken by a scanning electron microscope (SEM). As shown in FIGS. 3 and 4, when the laser beam α undergoing continuous oscillation illuminates the portion of the electrode precursor 20 where the active material layers 22 are formed, at the cut portion $C_{22}$, protrusions 25 are sometimes formed on the end surfaces 22e of the active material layers or near the end surfaces 22e. The protrusions 25 are formed when the active material layers 22 melted by illuminating the active material layers 22 with the laser are spread on both sides and are solidified on adjacent active material layers 22. The protruding height of each protrusion 25 from an upper surface of the corresponding active material layer 22 is desirably 10 μm to 100 μm, and is more desirably 10 μm to 80 μm. In the example shown in FIG. 3, the protrusions 25 are formed on surfaces of the respective active material layers 22 on the side where the laser beam α impinges upon first. Since such protrusions 25 may cause a short circuit to occur between the positive and negative electrodes, it is desirable that the protrusions 25 be removed. For example, by compressing the active material layers 22, it is possible to embed the protrusions 25 into the active material layers 22, or to cause the protrusions 25 to come off from upper portions of the active material layers 22. It is also possible to suppress formation of protrusions 25 by controlling laser illumination conditions.

When the laser beam α illuminates the portion of the electrode precursor 20 where the active material layers 22 are formed, it is desirable that the angle θ1 formed by the end surface 22e of each active material layer 22 on the side where the laser beam α impinges upon first and its corresponding core-body surface 21s be, for example, 55° to 85°. At the cut portion $C_{22}$, the core-body surfaces 21s are covered by the respective active material layers 22 and are not exposed, and the cut portions $C_{22}$ and $C_{23}$ each become a neat linear cut portion. It is desirable that the angle θ1 be, for example, substantially equal to the angle θ2 formed by the surface of each active material layer 22 on the opposite side and its corresponding end surface 22e.

Although it is desirable that laser illumination conditions be adjusted on the basis of, for example, the material, the thickness, and the cutting shape of the long core body 21 and the active material layers 22, in general, it is desirable that the output of the continuous wave laser (the laser oscillator 31) be 500 W to 5000 W, and the spot diameter of the laser beam α be 5 μm to 100 μm. It is desirable that the cutting speed of cutting the electrode precursor 20 by the continuous wave laser be, for example, 500 mm/s to 8000 mm/s. The illumination conditions when the electrode precursor 20 is a positive-electrode precursor and the illumination conditions when the electrode precursor 20 is a negative-electrode precursor may differ from each other. In general, the positive-electrode precursor is easier to cut.

Examples of more desirable ranges regarding the laser output, the spot diameter, and the cutting speed are as follows.

It is desirable that the laser output be 1000 W to 3000 W.
The spot diameter is desirably 10 μm to 100 μm, and is more desirably 10 μm to 40 μm.
It is more desirable that the cutting speed be 1000 mm/s to 5000 mm/s.

Figure 5:
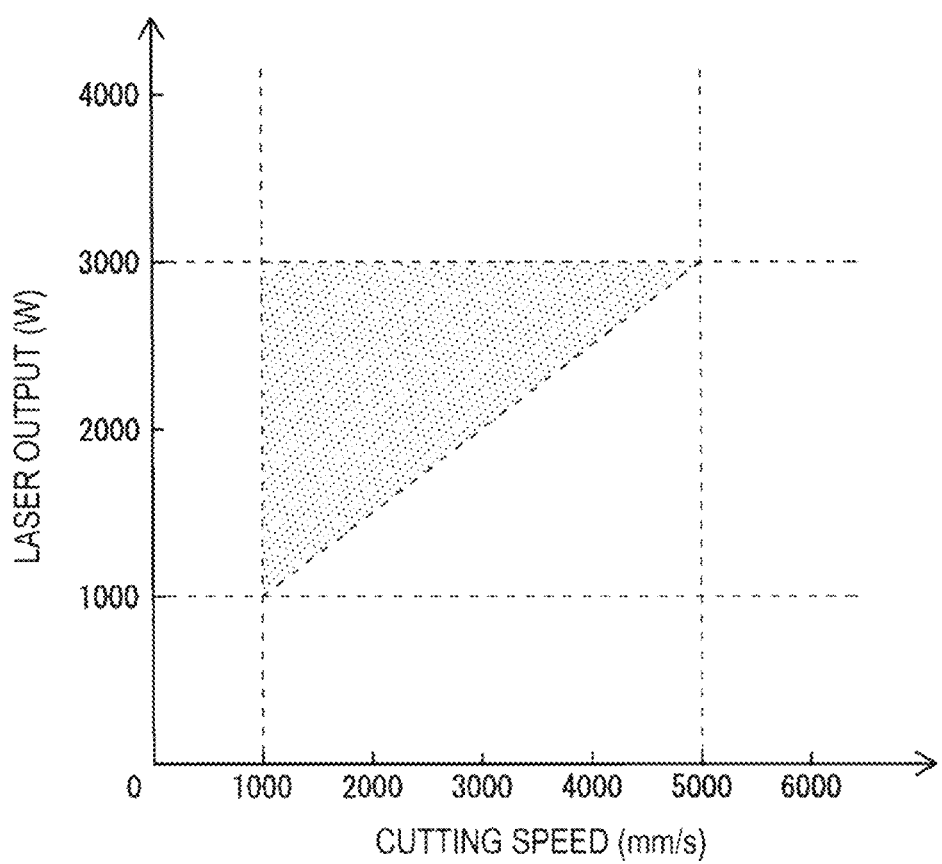
FIG. 5 is an illustration showing the relationship between a laser output and a cutting speed.

FIG. 5 is an illustration showing the relationship between the laser output and the cutting speed. Although, as mentioned above, it is desirable that the laser output be 1000 W to 3000 W and the cutting speed be 1000 mm/s to 5000 mm/s, it is more desirable that the laser output and the cutting speed have the relationship indicated by the triangle of FIG. 5. That is, it is desirable to adjust the laser output and the cutting speed such that the laser output and the cutting speed are within the triangle whose vertices are a first point where the laser output is 1000 W and the cutting speed is 1000 mm/s, a second point where the laser output is 3000 W and the cutting speed is 1000 mm/s, and a third point where the laser output is 3000 W and the cutting speed is 5000 mm/s.

By adjusting the laser output and the cutting speed in the range indicated by the triangle of FIG. 5, it becomes easier to form neat linear cut portions and to also further suppress formation of protrusions 25. If the cutting speed is greater than or equal to 1000 mm/s, it is possible to ensure good productivity. It is desirable that the illumination conditions be further changed as appropriate within the range of the triangle in accordance with, for example, the material, the thickness, and the cutting shape of the long core body 21 and the active material layers 22. For example, when conditions close to those at the third point where the laser output is 3000 W and the cutting speed is 5000 mm/s are applied, compared to when conditions close to those at the other two points are applied, it is observed that although cutting can be performed at a higher speed, the cut portions tend to be rough. Therefore, when the cutting shape is simple, the conditions close to those at the third point may be applied.

It is desirable that the manufacturing process of the secondary-battery electrode 10 further include the step of compressing the active material layers cut by the continuous wave laser. The active material layers are compressed by, for example, using rolling rollers that nip the electrode precursor 20 from both sides thereof. Although the step of compressing the active material layers may be performed before the second step, which is a step of cutting the electrode precursor 20, it is desirable to perform the step of compressing the active material layers after the second step. When the electrode precursor 20 before the compression is cut with the continuous wave laser, it is possible to more reliably form a secondary-battery electrode having neat linear cut portions at a high speed. When the compressing step is performed after the second step, even if protrusions 25 are formed by the cutting with the continuous wave laser, it is possible to compress the protrusions 25 and embed the protrusions 25 into the active material layers, or to cause the protrusions 25 to come off from the upper portion of the active material layers. Although the compressing step may be performed after cutting the electrode precursor 20 into individual electrode sizes, considering productivity, it is desirable to, for example, perform the compressing step while the electrode precursor 20 has its size adjusted to a width corresponding to the width of one secondary-battery electrode 10. Then, after the compressing step, it is desirable to cut the electrode precursor 20 to the electrode sizes.

As described above, by cutting the electrode precursor 20 by using the continuous wave laser, it is possible to form, for example, neat linear cut portions $C_{22}$ and $C_{23}$ at a high speed and to thus greatly increase the productivity of the secondary-battery electrode 10.

A structure of a secondary battery 100 using the secondary-battery electrode 10 is hereunder described.

As shown in FIG. 6, in the secondary battery 100, an electrode body 50 in which a plurality of positive electrodes and a plurality of negative electrodes are alternately stacked upon each other via separators is, along with an electrolyte (not shown), accommodated in a battery case 60. Here, as the positive and negative electrodes, secondary-battery electrodes 10 are used. An opening portion of the battery case 60 is sealed by a sealing body 61. A positive-electrode terminal 62 and a negative-electrode terminal 63 are fixed to the sealing body 61 via resin members 64 and 65, respectively. The positive electrodes are electrically connected to the positive-electrode terminal 62 via a positive-electrode lead portion 51 and a positive-electrode current-collecting member 52. The negative electrodes are electrically connected to the negative-electrode terminal 63 via a negative-electrode lead portion 53 and a negative-electrode current-collecting member 54. A liquid injection hole for injecting the electrolyte is provided in the sealing body 61. After injecting the electrolyte, the liquid injection hole is sealed by a sealing member 66. The sealing body 61 is provided with a gas discharge valve 67 that releases pressure when the internal pressure of the battery case 60 has been raised. When the battery case 60 is made of a metal, it is desirable that the electrode body 50 be disposed in the battery case 60 with the electrode body 50 disposed in an insulating sheet 55 in the form of a box or a bag.

It is desirable that the positive-electrode lead portion 51 protruding from each positive electrode be curved and be connected to a portion of the positive-electrode current-collecting member 52 disposed substantially parallel to the sealing body 61. It is desirable that the negative-electrode lead portion 53 protruding from each negative electrode be curved and be connected to a portion of the negative-electrode current-collecting member 54 disposed substantially parallel to the sealing body 61. Therefore, a secondary battery having a higher volumetric energy density is provided.

It is desirable that the positive electrodes and the negative electrodes that have end surfaces formed by cutting with the continuous wave laser and that are manufactured by the above-described method be adhered to each other by separators disposed between the positive electrodes and the negative electrodes. As the adhering method, it is desirable that an adhesion layer be formed on a surface of each separator made of, for example, polyolefin, such as polypropylene or polyethylene, or on a surface of each active material layer of each electrode, and that the separators and the active material layers be adhered to each other by the adhesion layers. It is desirable that the adhesion be, for example, pressure bonding or thermal welding. Although the adhesion layers are not particularly limited, it is desirable that the adhesion layers be layers that are softer than the separators. The adhesion layers are desirably made of a resin for which, for example, polyvinylidene fluoride, carboxymethyl cellulose, or polyvinyl alcohol may be used.

When the active material layers and the separators are to be adhered to each other by the adhesion layers, it is desirable that the adhesion layers contact the protrusion marks 15. This makes it possible to prevent the protrusion marks 15 from sliding down from the active material layers when using the secondary battery.

When the separators and the active material layers are adhered to each other, it may be less likely for the electrolyte to permeate the active material layers. However, as described above, when the angle θ1 formed by the end surface 12e of the active material layer 12 and the core-body surface 11s is 55° to 85°, since the area of the end surface of the active material layer is increased, the electrolyte easily permeates the active material layer.

<Other>

A protective layer may be provided on a portion of the lead portion 14 that is adjacent to the active material layers 22, the protective layer being formed from ceramic particles, such as alumina, zirconia, or titania particles, and a binding material. The protective layer may contain a conductive material, such as a carbon material.

As a method of manufacturing positive electrodes or negative electrodes using a winding-type electrode body in which long positive electrodes and long negative electrodes are wound via separators, it is possible to apply the secondary-battery electrode manufacturing method according to the present disclosure. In this case, it is desirable that, at a side of one of the end portions in a direction of extension of a winding axis of the winding-type electrode body, a plurality of positive-electrode lead portions that are provided at the positive electrodes and a plurality of negative-electrode lead portions that are provided at the negative electrodes be disposed. Therefore, a secondary battery having a higher volumetric energy density is provided. It is desirable that, instead of being formed at equal intervals, the plurality of positive-electrode lead portions that are provided at the long positive electrodes be formed at different intervals such that the plurality of positive-electrode lead portions are stacked in the winding-type electrode body. This also applies to the positions of formation of the plurality negative-electrode lead portions that are provided at the long negative electrodes.

The long positive electrodes are electrodes in which active material layers are formed on two sides of the core body. When the amount of active material layers on the side of one surface (in FIG. 1, corresponding to the upper active material layer) is less than the amount of active material layers on the side of the other surface (in FIG. 1, corresponding to the lower active material layer), it is desirable that the active material layers disposed on the side of the one surface and whose amount is smaller be disposed on the side of the winding center of the winding-type electrode body. The amount of negative electrode active material layers that are positioned on an inner side of the corresponding positive electrodes in the winding-type electrode body is ordinarily less than the amount of negative electrode active material layers positioned on the outer side. Therefore, in the above-described structure, the opposing state of the positive electrode active material layers and the negative electrode active material layers are brought into a more desirable balanced state.

REFERENCE SIGNS LIST 10 secondary-battery electrode
11 core body
11s core-body surface
12 active material layer
12e, 22e end surface
13 base portion
14 lead portion
15 protrusion mark
20 electrode precursor
21 long core body
21s core-body surface
22 active material layer
22e end surface
23 exposed portion
24 protruding portion
25 protrusion
30 laser system 31 laser oscillator
32 collimator
33 galvanometer scanner
34 reflecting mirror
35 optical element
36 X-axis mirror
37 Y-axis mirror
38 Fθ lens
39 protective glass
100 secondary battery
$C_{22}$, $C_{23}$ cut portion
α laser beam
P illumination sport
X scheduled cutting portion

The invention claimed is:

1. A secondary-battery electrode manufacturing method, comprising:
a first step of forming an active material layer on at least one surface of a long core body; and
a second step of cutting an electrode precursor into a predetermined shape by using a continuous wave laser, the electrode precursor being the long core body having the active material layer formed thereon,
wherein the second step of cutting the electrode precursor includes cutting, by the continuous wave laser, the active material layer formed on the surface of the core body,
the method further comprising:
after the second step of cutting, a step of compressing a portion of the active material layer which has been previously cut by the continuous wave laser,
wherein the step of compressing includes pressing protrusions formed on the cut portion of the active material layer,
wherein said protrusions protrude beyond an uncut surface of the active material layer adjacent thereto in a direction away from the surface of the core body.

2. The secondary-battery electrode manufacturing method according to claim 1,
wherein, in the first step, an exposed portion, where a surface of the long core body is exposed, is formed in a longitudinal direction of the electrode precursor, and
wherein, in the second step, by using the continuous wave laser, a portion of the electrode precursor where the active material layer is provided is cut along the exposed portion, and a cutting direction is changed at a predetermined timing to cut the exposed portion, so that a protruding portion, which becomes an electrode lead, is formed in the exposed portion along the longitudinal direction of the electrode precursor.

3. The secondary-battery electrode manufacturing method according to claim 1, wherein, in the second step, by using the continuous wave laser, the electrode precursor is cut into an electrode size.

4. The secondary-battery electrode manufacturing method according to claim 1,
wherein an output of the continuous wave laser is 1000 W to 3000 W,
wherein a spot diameter of a laser beam output from the continuous wave laser is 10 μm to 100 μm, and
wherein a cutting speed of cutting the electrode precursor by the continuous wave laser is 1000 mm/s to 5000 mm/s.

5. The secondary-battery electrode manufacturing method according to claim 1,
wherein, in the second step, at a portion cut by using the continuous wave laser, an angle formed by an end surface of the active material layer and a surface of the long core body is 55° to 85°, and
wherein a protrusion exists at the end surface of the active material layer or near the end surface of the active material layer.

6. A method of manufacturing a secondary battery using the secondary-battery electrode manufactured by the method of manufacturing according to claim 1.

* * * * *